United States Patent Office.

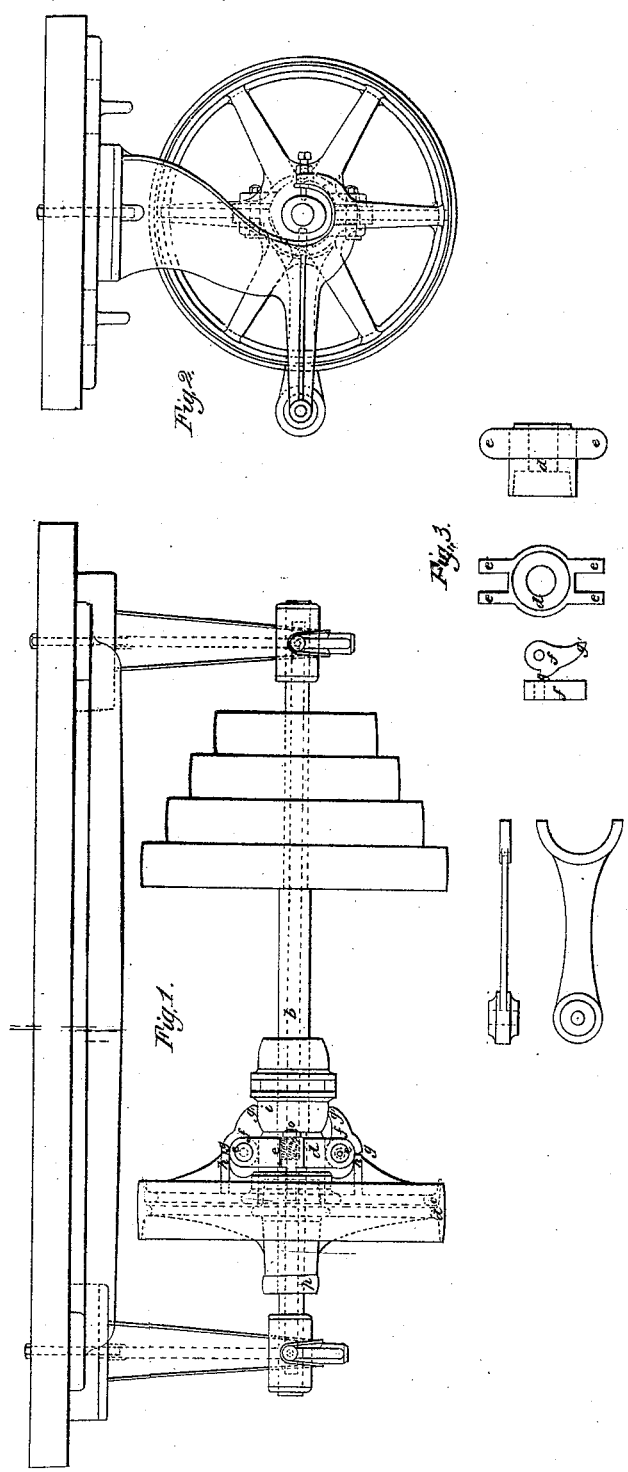

FRANCIS A. PRATT, OF HARTFORD, CONNECTICUT, ASSIGNOR TO PRATT WHITNEY & CO., OF SAME PLACE.

Letters Patent No. 100,064, dated February 22, 1870.

IMPROVEMENT IN FRICTION-CLUTCHES.

The Schedule referred to in these Letters Patent and making part of the same.

*To all whom it may concern:*

Be it known that I, FRANCIS A. PRATT, of the city and county of Hartford, and State of Connecticut, have invented certain new and useful Improvements in the Manufacture of Friction-Clutch; and to enable others skilled in the art to make and use the same, I will proceed to describe its construction and operation, referring to the drawings in which the same letters indicate like parts in each of the figures.

The object of this invention is to simplify its construction and perfect its operation, thereby rendering it more positive in its operation, easily adjusted and kept in working order by ordinary workmen.

In the accompanying drawings—

Figure 4 is a side detail view.

Figure 2 is an end view of the same.

Figure 3 are side and edge views of the collar $d$ and dogs $f$.

It consists of a loose pulley, $a$, arranged to fit closely and turn freely upon the shaft $b$.

The inside rim surface of its periphery is made incline, wedge, or bevel shape.

$c$ is a rim-wheel, the hub of which is fitted closely, and traverses freely upon the shaft $b$, or upon the hub of the wheel $a$.

The bearing of the hub of the rim-wheel $c$ may be wholly or mostly fitted to and traversed upon the hub of the wheel $a$, thus allowing the pulley $a$ to have a longer hub and bearing upon the shaft $b$.

The rim of the wheel $c$ is fitted nicely to the inside periphery, wedge, or bevel surface of the rim of the wheel $a$, thus producing the union of two wedge surfaces, equal to the whole circumference of the wheels $a$ $c$.

$d$ is a collar fitted closely and secured firmly upon the shaft $b$, having ears $e$ between which are fitted and secured dogs $f$, the form of which is clearly shown in fig. 3, by means of bolts or pins, so that they shall have a close and free action therein. The parts $g$ take their bearing against the prominence $h$ of the wheel $c$, while the parts $g'$ are acted upon by the cam shape of the collar $i$.

The collar $d$ is also provided with sockets $k$, chambered to receive dowel or driving-pins $o$, the outer ends of which are provided with a flange head.

Upon these pins, and within the chamber of these sockets, are arranged springs $n$. One end of said spring bears against the head of the pins, and the other end against the inner end of the socket chamber, for the purpose of holding or reacting the rim-wheel $c$ back closely to the collar $i$ when its surface friction is not required. The inner ends of these driving pins $o$ are firmly secured in the wheel $c$; they also serve the purpose of holding the pulley or rim-wheel $c$ in its relative position with the collar $d$, and are driven thereby.

$p$ is an adjusting collar or screw-nut, fitted to the shaft $b$, and close to the hub of the wheel $a$ for the purpose of nicely and accurately adjusting the relative distance or position of the pulley $a$ to the action of the rim-wheel $c$ and collar $i$, so that but a small motion only is required of the clutch through the medium of the dogs $f$ to bring the two bevel or wedge surfaces of the wheels $a$ $c$ firmly together, to secure unity of action of the shaft $b$ with the pulley $a$, and by an opposite motion of the clutch, the pulley $a$ will turn loosely and freely upon its shaft. Thus, by pushing the cam-shape clutch-collar $i$ toward the wheel $c$ by means of a clutch in the common way, the outer ends $g'$ of the dogs $f$ are expanded, and the heel or parts $g$ bearing against the wheel $c$ causes the wedge or friction surface of the two wheels $a$ $c$, to be firmly compressed together, thus avoiding the least liability of cramping, which would prevent free action, and rendering it less liable to get out of order.

By this invention the heretofore unsatisfactory operation and difficulty of adjustment is effectually removed, and the whole device so constructed that its durability and utility are fully secured.

I believe I have thus shown the nature, construction, and advantage of this invention, so as to enable others skilled in the art to make and use the same therefrom.

What I claim in a friction-clutch device, is—

1. The combination of the screw-collar $p$ for the purpose of adjusting the pulley $a$ in its relative position with the wheel $c$ upon the shaft $b$, substantially as set forth.

2. The actuating pressure-dogs $f$, hung upon a fulcrum pin in the ears $e$, one part $g'$ extending over and acted upon by the cam or wedge-collar $i$, and the other part $g$ outward in a line nearly at right angles with the former and acting against the friction-wheel $c$, substantially as set forth.

3. The combination of the fixed collar $d$ with the dogs $f$ and clutch-collar $i$, for compressing and locking the wheel $c$ in close contact with the wheel $a$, substantially as set forth.

4. The combination of the fixed collar $d$, adjusting screw-collar $p$, actuating collar $i$ with the pulleys or wheels $a$ $c$ and dogs $f$ arranged upon the shaft $b$, substantially as set forth.

5. The driving-pins $o$, in combination with the friction-wheel $c$ and collar $d$, substantially as set forth.

Witnesses:    FRANCIS A. PRATT. [L. S.]
   MONROE STANNARD,
   JEREMY W. BLISS.